United States Patent
Shen et al.

(10) Patent No.: US 7,616,381 B2
(45) Date of Patent: Nov. 10, 2009

(54) OPTICAL SYSTEM

(75) Inventors: Wei Shen, Tainan County (TW);
Chia-Yu Hu, Tainan County (TW);
Chun-Min Chen, Tainan County (TW)

(73) Assignee: Himax Display Inc., Tainan County (TW)

( * ) Notice: Subject to any disclaimer, the term of this patent is extended or adjusted under 35 U.S.C. 154(b) by 0 days.

(21) Appl. No.: 12/038,388

(22) Filed: Feb. 27, 2008

(65) Prior Publication Data
US 2009/0213448 A1    Aug. 27, 2009

(51) Int. Cl.
*G02B 27/14* (2006.01)
(52) U.S. Cl. ..................................... 359/629
(58) Field of Classification Search .......... 359/629–640
See application file for complete search history.

(56) References Cited

U.S. PATENT DOCUMENTS

| | | | | |
|---|---|---|---|---|
| 5,982,343 | A * | 11/1999 | Iba et al. | 345/8 |
| 6,570,711 | B2 * | 5/2003 | Ducellier | 359/629 |
| 7,281,806 | B2 * | 10/2007 | O'Donnell et al. | 353/94 |
| 7,364,302 | B2 * | 4/2008 | Conner | 353/20 |
| 2002/0154273 | A1 * | 10/2002 | Seo et al. | 353/20 |
| 2004/0145814 | A1 * | 7/2004 | Rogers | 359/634 |
| 2006/0007539 | A1 * | 1/2006 | Mihalakis | 359/495 |
| 2006/0146288 | A1 | 7/2006 | Peng et al. | |
| 2007/0047078 | A1 | 3/2007 | Li | |
| 2007/0146880 | A1 * | 6/2007 | Bleha et al. | 359/468 |

* cited by examiner

*Primary Examiner*—Ricky L Mack
*Assistant Examiner*—Vipin M Patel
(74) *Attorney, Agent, or Firm*—J.C. Patents (57) ABSTRACT

An optical system, adapted for providing an image beam, including a light source, a beam splitting/combining device, and a light valve is provided. The light source provides an illumination beam. The beam splitting/combining device includes a first polarizing beam splitter (PBS), a second PBS, a quarter wave plate (QWP), and a reflector. The first PBS reflects a first illumination beam of the illumination beam from the light source and the second illumination beam from the light source passes through the first PBS. The second illumination beam from the first PBS passes through the second PBS and the QWP, reflected by the reflector, passes through the QWP, and reflected by the second PBS. The light valve converts the first illumination beam from the first PBS and the second illumination beam reflected by the second PBS into the image beam.

10 Claims, 8 Drawing Sheets

OPTICAL SYSTEM

BACKGROUND OF THE INVENTION

1. Field of the Invention

The present invention generally relates to a projector, in particular, to an optical system.

2. Description of Related Art

In the recent years, projectors are widely utilised in various applications, such as meeting, education, and entertainment. Therefore, projectors with higher quality, smaller volume, lighter weight, and lower price are demanded.

Figure 1A:
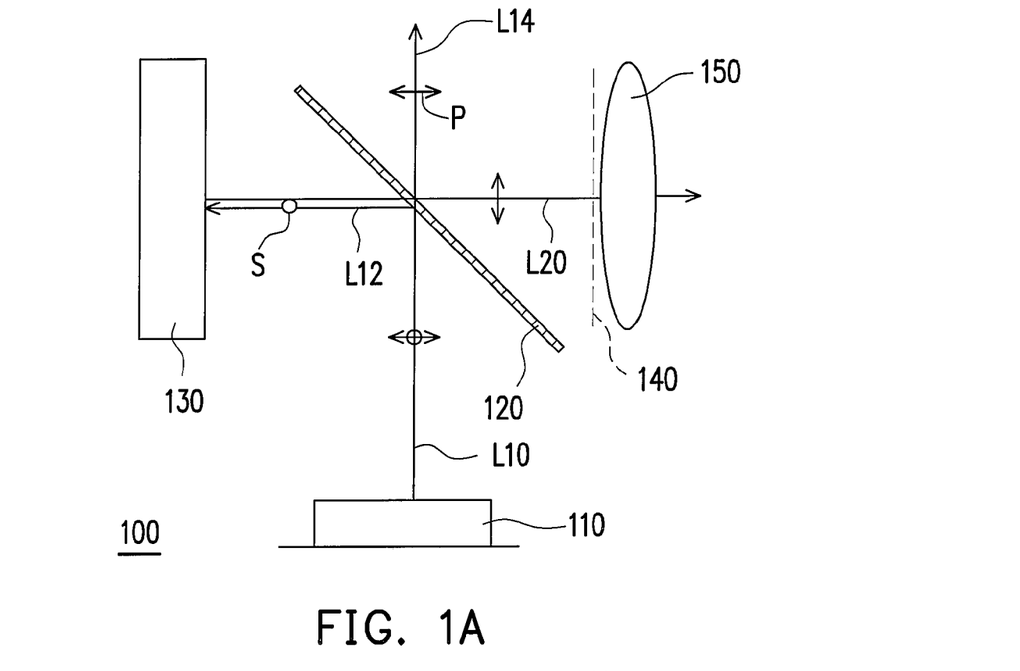
FIG. 1A illustrates a conventional optical system.

Conventionally, a projector includes a projector lens and an optical system. FIG. 1A illustrates a conventional optical system. Referring to FIG. 1A, optical system 100 has a light source 110, a polarizing beam splitter (PBS) 120, and a light valve 130, an analyzer 140 and a lens 150. The PBS 120 disposed on the light path of the illumination beam L10 emitted by the light source 110, where the illumination beam L10 is separated into a first illumination beam L12 with S polarization and a second illumination beam with P polarization by the PBS 120. The first illumination beam L12 is reflected by the PBS 120, while the second illumination beam L14 passes through by the PBS 120. The first illumination beam L12 is then reflected by the light valve 130 and converted into an image beam L20 with P polarization. The image beam L20 passes through the PBS 120, the analyzer 140, and the lens 150.

Figure 1B:
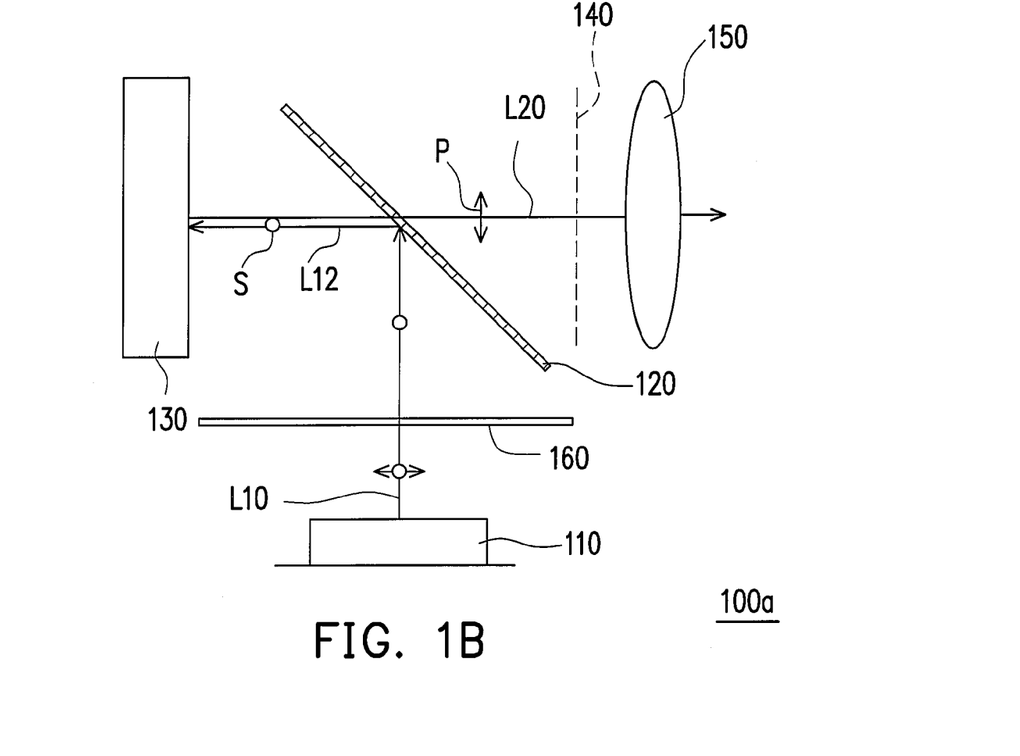
FIG. 1B illustrates another conventional optical system.

FIG. 1B illustrates another conventional optical system. Referring to FIG. 1B, the difference between the optical system 100 in FIG. 1A and the optical system 100a in FIG. 1B is that the optical system 100a further includes a reflective polarizer 160 disposed between the light source 110 and the PBS 120. The reflective polarizer 160 transmits the first illumination beam L12 with S polarization, while reflects the second illumination beam L14 with P polarization. Thus, only the first illumination beam L12 reaches the PBS 120 and light valve 130 and being converted into image beam L20.

SUMMARY OF THE INVENTION

Accordingly, the present invention is directed to an optical system, which has better performance and higher efficiency.

The present invention provides an optical system, adapted for providing an image beam, including a light source, a beam splitting/combining device, and a light valve. The light source provides an illumination beam. The beam splitting/combining device includes a first polarizing beam splitter (PBS), a second PBS, a quarter wave plate (QWP), and a reflector. The first PBS reflects a first illumination beam of the illumination beam from the light source and the second illumination beam from the light source passes through the first PBS. The second illumination beam from the first PBS passes through the second PBS and the QWP, reflected by the reflector, passes through the QWP, and reflected by the second PBS. The light valve converts the first illumination beam from the first PBS and the second illumination beam reflected by the second PBS into the image beam.

According to an embodiment of the present invention, the optical system further includes an analyzer, disposed on the optical path of the image beam.

According to an embodiment of the present invention, the reflector is a reflective film coated on the QWP.

According to an embodiment of the present invention, the first polarization is S polarization and the second polarization is P polarization.

According to an embodiment of the present invention, the first polarization is P polarization and the second polarization is S polarization.

The present invention further provides an optical system, adapted for providing an image beam, including a light source, a beam splitting/combining device, and a light valve. The light source provides an illumination beam. The beam splitting/combining device includes a first PBS, a second PBS, a half wave plate (HWP), and a reflector. The first PBS reflects the first illumination beam from the light source, and the second illumination beam from the light source passes through the first PBS. The second illumination beam from the first PBS passes through the HWP. The second PBS reflects the second illumination beam from the HWP. The light valve converts the first illumination beam from the first PBS into a first image beam passing through the first PBS, and converts the second illumination beam from the second PBS into a second image beam passing through the second PBS, wherein the first image beam combines with the second image beam to form the image beam.

According to an embodiment of the present invention, the optical system further includes an analyzer, disposed on the optical path of the image beam.

According to an embodiment of the present invention, the first polarization is S polarization and the second polarization is P polarization.

According to an embodiment of the present invention, the first polarization is P polarization and the second polarization is S polarization.

The present invention further provides an optical system, adapted for providing an image beam, including a light source, a beam splitting/combining device, and a light valve. The light source provides an illumination beam. The beam splitting/combining device includes a first PBS, a second PBS, a QWP, a first reflector, and a second reflector. The first PBS reflects the first illumination beam from the light source, and the second illumination beam from the light source passes through the first PBS. The second PBS reflects the second illumination beam from the first PBS. The first illumination beam reflected by the first PBS passes through the QWP. The first reflector reflects the first illumination beam from the QWP, wherein the first illumination beam from the first reflector passes through the QWP, and then passes through the first PBS. The second reflector reflects the first illumination beam passing through first PBS, wherein the first illumination beam reflected by the second reflector is reflected by the second reflector. The light valve converts the first illumination beam from the second PBS into a first image beam passing through the second PBS, and converts the second illumination beam from the second PBS into a second image beam passing through the second PBS, wherein the first image beam combines with the second image beam to form the image beam.

According to an embodiment of the present invention, the optical system further includes an analyzer, disposed on the optical path of the image beam.

According to an embodiment of the present invention, the first polarization is S polarization and the second polarization is P polarization.

According to an embodiment of the present invention, the first polarization is P polarization and the second polarization is S polarization.

The present invention further provides an optical system, adapted for providing an image beam, including a light source, a beam splitting/combining device, and a light valve. The light source provides an illumination beam. The beam splitting/combining device includes a first PBS, a second PBS, a HWP, and a reflector. The first PBS reflects the first illumination beam from the light source, and the second illumination beam from the light source passes through the first PBS. The second PBS reflects the first illumination beam from the first PBS. The second illumination beam from the first PBS passes through the HWP. The reflector reflects the second illumination beam from the HWP, wherein the second illumination beam reflected by the reflector is reflected by the second PBS. The light valve converts the first illumination beam from the second PBS into a first image beam passing through the second PBS, and converts the second illumination beam from the second PBS into a second image beam passing through the second PBS, wherein the first image beam combines with the second image beam to form the image beam.

According to an embodiment of the present invention, the optical system further includes an analyzer, disposed on the optical path of the image beam.

According to an embodiment of the present invention, the first polarization is S polarization and the second polarization is P polarization.

According to an embodiment of the present invention, the first polarization is P polarization and the second polarization is S polarization.

As described above, in the embodiments of the present invention, both of the first illumination beam and the second illumination beam are converted into image beam. Thus, the optical systems in the embodiments of the present invention have better performance and higher efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
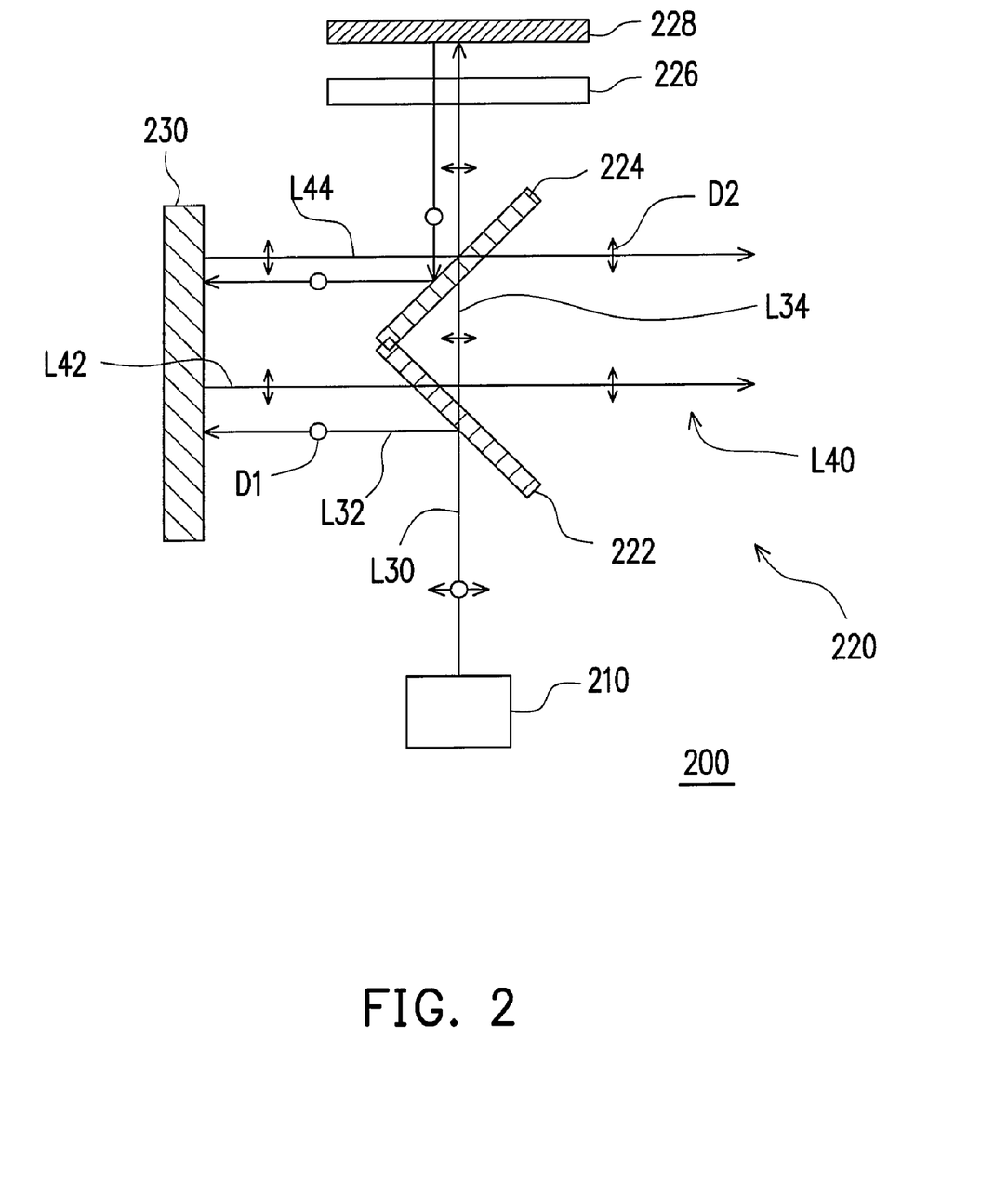
FIG. 2 illustrates an optical system according to an embodiment of the present invention.

FIG. 2 illustrates an optical system according to an embodiment of the present invention. Referring to FIG. 2, the optical system 200, providing an image beam L40, includes a light source 210, a beam splitting/combining device 220, and a light valve 230. The light source 210 provides an illumination beam L30 including a first illumination beam L32 with a first polarization D1 and a second illumination beam L34 with a second polarization D2, and the beam splitting/combining device 220 disposed on the light path of the illumination beam L30. The beam splitting/combining device 220 includes a first polarizing beam splitter (PBS) 222, a second PBS 224, a quarter wave plate (QWP) 226, and a reflector 228.

The first PBS 222 reflects the first illumination beam L32 with the first polarization D1 coming from the light source 210 to the light valve 230 while transmits the second illumination beam L34 with the second polarization D2 coming from the light source 210. The second illumination beam L34 from the first PBS 222 passes through the second PBS 224 and the QWP 226, and then reflected by the reflector 228. The second illumination beam L34 coming from the reflector 228 passes through the QWP 226, converted into the second illumination beam L34 with the first polarization D1, and then reflected by the second PBS 224 to the light valve 230. The light valve 230 converts the first illumination beam L32 coming from the first PBS 222 into a first image beam L42 and converts the second illumination beam L34 reflected by the second PBS 224 into a second image beam L44. Both of the first image beam L42 and the second image beam L44 have the second polarization D2, and the first image beam L42 and the second image beam L44 pass through the first PBS 222 and the second PBS respectively, then combine to form the image beam L40.

The optical system 200 utilizes the second PBS 224 and the reflector 228 so that not only the first illumination beam L32, but also the second illumination beam L34 can be converted into the image beam L40. Therefore, the optical system 200 has higher efficiency and better performance, which increases the image quality of the projector using the optical system 200.

Figure 3:
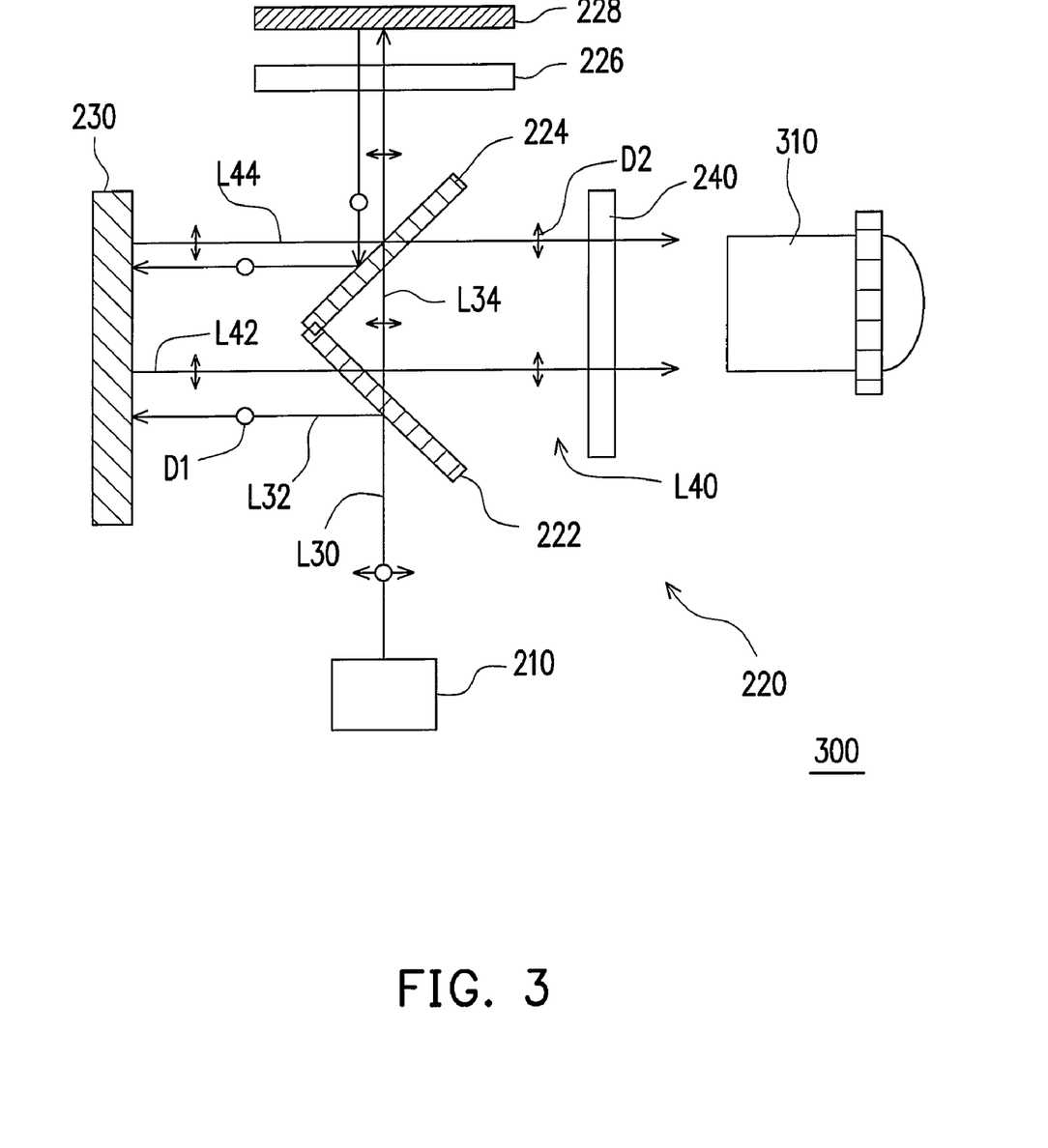
FIG. 3 illustrates a projector according to an embodiment of the present invention.

The optical system 200 may be applied to a projector 300. FIG. 3 illustrates a projector according to an embodiment of the present invention. Referring to FIG. 3, projector 300 has the optical system 200 and a projecting lens 310. The projecting lens 310 is disposed on the light path of the image beam L40 coming from the optical system 200. The projecting lens 310 projects the image beam L40 on a screen (not shown in the figures) to form an image (not shown in the figures). Moreover, the optical system 200 may further have an analyzer 240 disposed on the light path of the image beam L40, and between the first PBS 222, the second PBS 224, and the converging lens 330. The analyzer 330 further polarizes the image beam L40 so as to raise the contrast of the image.

Figure 4:
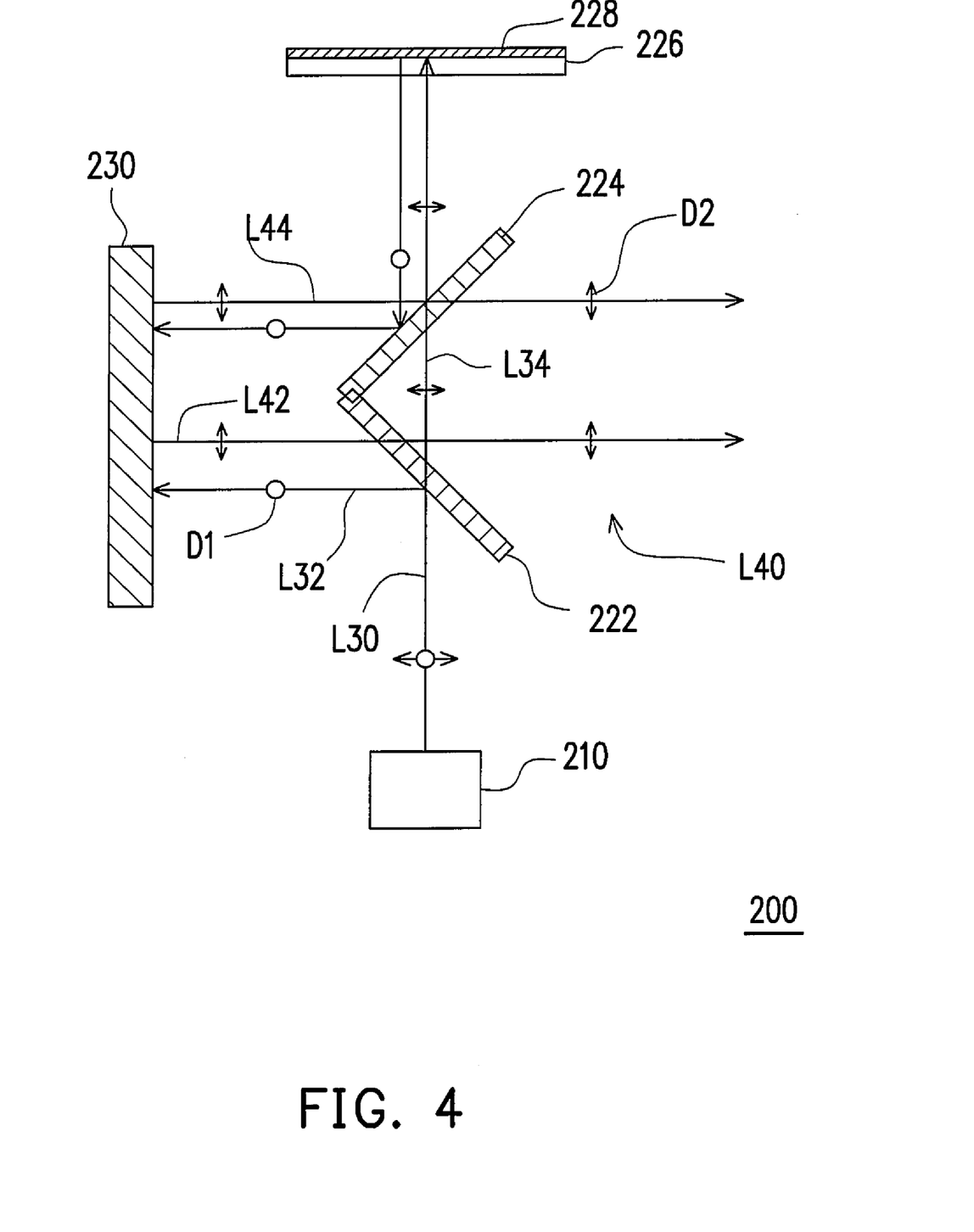
FIG. 4 illustrates another implementation of the optical system in FIG. 2.

The first polarization D1 may be S polarization, while the second polarization D2 may be P polarization. Nevertheless, first polarization D1 may as well be P polarization, while D2 maybe S polarization. The first and second PBS may be wire-grid polarizer, thin-film polarizer, or polymer-film polarizer, in the form of cube or plate. The light valve may be a reflective light valve, such as LCOS (liquid crystal on silicon). Moreover, the reflector 228 and the QWP 226 may be implemented in other way. FIG. 4 illustrates another implementation of the optical system in FIG. 2. Referring to FIG. 4, in the present embodiment, reflector 228 may be a reflective film coated on the QWP 226.

It should be noted that though the aforementioned optical system 200 is used to demonstrate the present invention; nonetheless, the optical system can be implemented in other manners. Several other embodiments will be disclosed in the following. It is to be noticed that the following embodiments are partially similar to the embodiment shown in FIG. 2. In the following embodiment and the embodiment shown in FIG. 2, same or similar reference character refers to same or similar part. The difference between the following embodiments and the embodiment shown in FIG. 2 will be disclosed in the following paragraphs.

Figure 5:
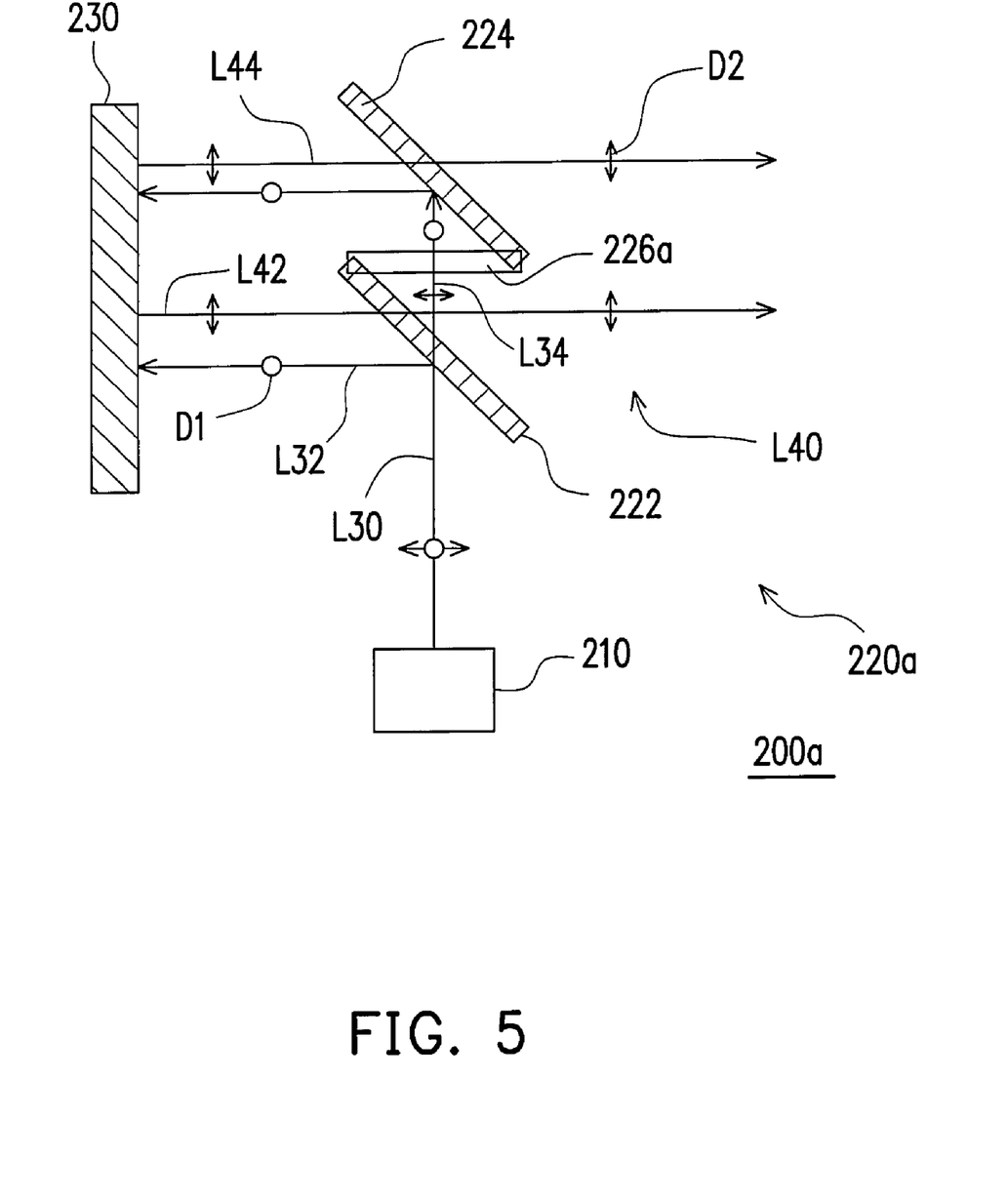
FIG. 5, FIG. 6A to FIG. 6C, and FIG. 7 illustrate optical systems according to embodiments of the present invention.

FIG. 5, FIG. 6A to FIG. 6C, and FIG. 7 illustrate optical systems according to embodiments of the present invention. Referring to FIG. 5, the beam splitting/combining device 220a in the optical system 200a includes a first PBS 222, a second PBS 224, and a half wave plate (HWP) 226a. The first PBS 222 reflects the first illumination beam L32 with the first polarization D1 coming from the light source 210 to the light valve 230 while transmits the second illumination beam L34 with the second polarization D2 coming from the light source 210. The second illumination beam L34 coming from the first PBS 222 is then passes through the HWP 226a and be converted into second illumination beam L34 with the first polarization D1. The second illumination beam L34 coming from the HWP 226a is then reflected by the second PBS 224 to the light valve 230. Both of the first image beam L42 and the second image beam L44 have the second polarization D2, and the first image beam L42 and the second image beam L44 pass through the first PBS 222 and the second PBS respectively, then combine to form the image beam L40.

Figure 6A:
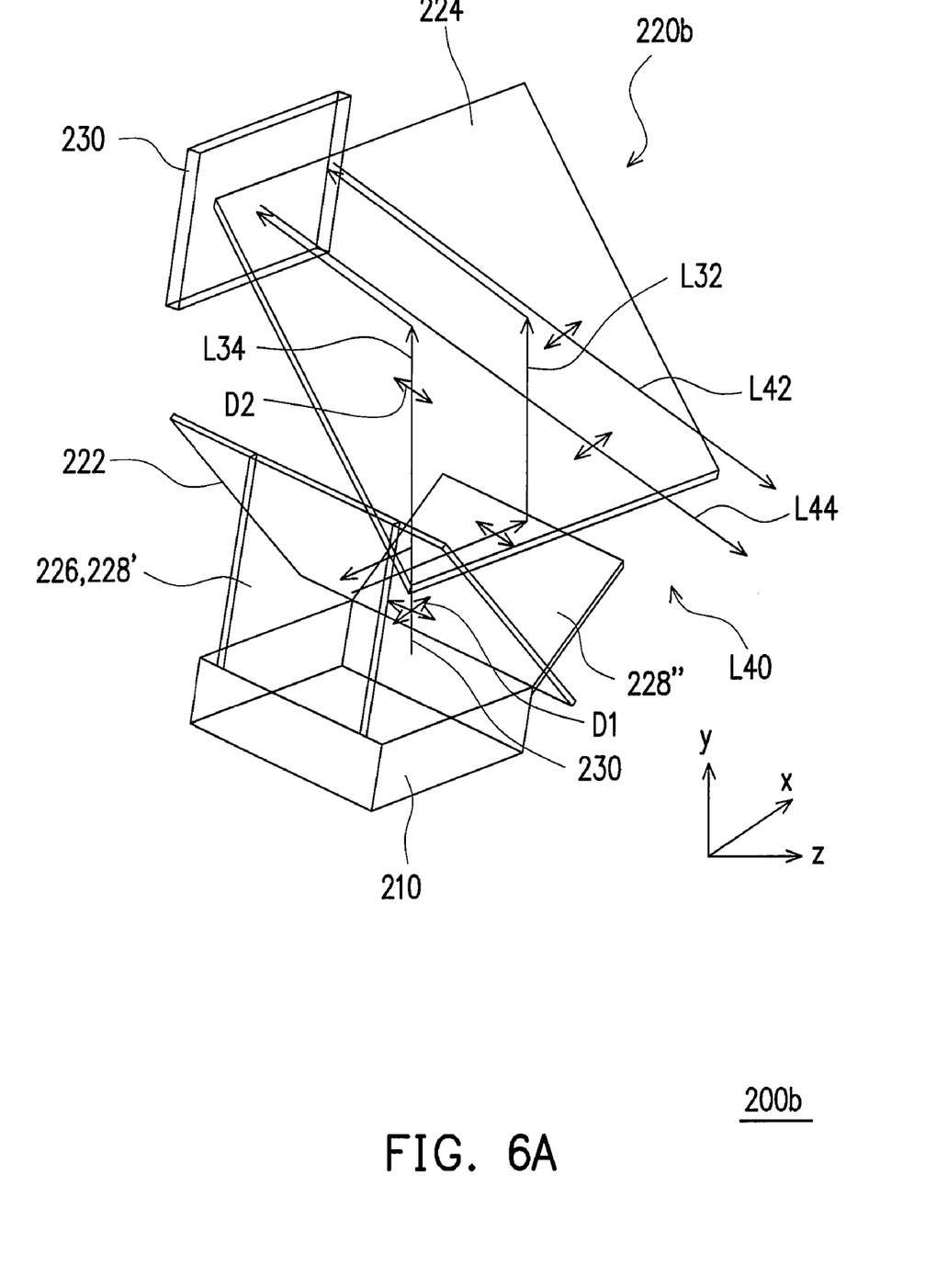
Figure 6B:
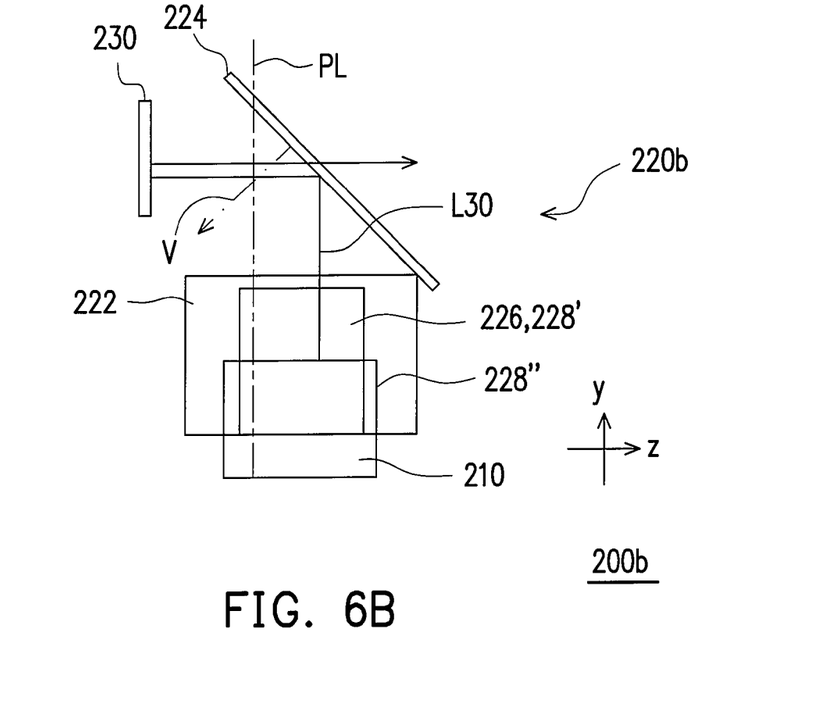
Figure 6C:
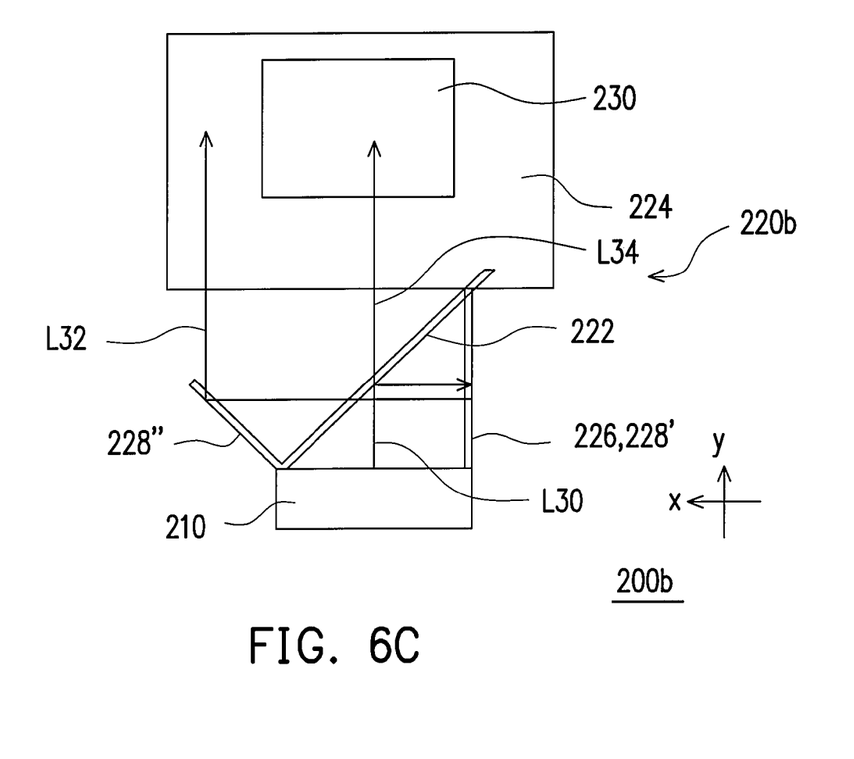

Referring to FIG. 6A to FIG. 6C. FIG. 6A is a 3-dimensional view of an optical system in the present embodiment, FIG. 6B is the front view of the optical system in FIG. 6A, and FIG. 6C is the side view of the optical system in FIG. 6A. Referring to FIG. 6A to 6C, the beam splitting/combining device 220b in the optical system 200b includes a first PBS 222, a second PBS 224, a QWP 226, a first reflector 228', and a second reflector 228". It is to be noted that the QWP 226 and first reflector 228' are illustrated as combined in FIG. 6 for the sake of clarity; however, the reflector 228' and the QWP 226 can be disposed individually as in the embodiment in FIG. 2. The first PBS 222 reflects the first illumination beam L32 with the first polarization D1 coming from the light source 210 to the light valve 230 while transmits the second illumination beam L34 with the second polarization D2 coming from the light source 210. The second PBS 224 reflects the second illumination beam L34 coming from the first PBS 222 to the light valve 230. The first illumination beam L32 is then passes through the QWP 226, reflected by the first reflector 228', passes through the QWP 226 again, and converts into the first illumination beam L32 with the second polarization D2. Next, the first illumination beam L32 passes through the first PBS 222, reflected by the second reflector 228", and then reflected by the second PBS 224 to the light valve 230. The light valve 230 converts the first illumination beam L32 and the second illumination beam L34 coming from the second PBS 224 into the first image beam L42 and the second image L44 respectively. The first image beam L42 and the second image beam L44 having the first polarization D1, pass through the second PBS 224 and combine to form the image beam L40.

In the present embodiment, the normal vector V of the second PBS 224 crosses a plane PL formed by the normal vectors (not shown in the figures) of the first PBS 222, the first reflector 228', the second reflector 228", and the QWP 226, that is to say, the light valve 230 doesn't lie on the plane PL, and the light path of the image beam may be perpendicular to the plane PL.

It should be noted that in the above embodiment shown in FIG. 6A to 6C, the second polarization D2 may be S polarization regarding the first BPS 222, but P polarization regarding the second PBS 224. On the other hand, the first polarization D1 may be P polarization regarding the first BPS 222, but S polarization regarding the second PBS 224.

Figure 7:
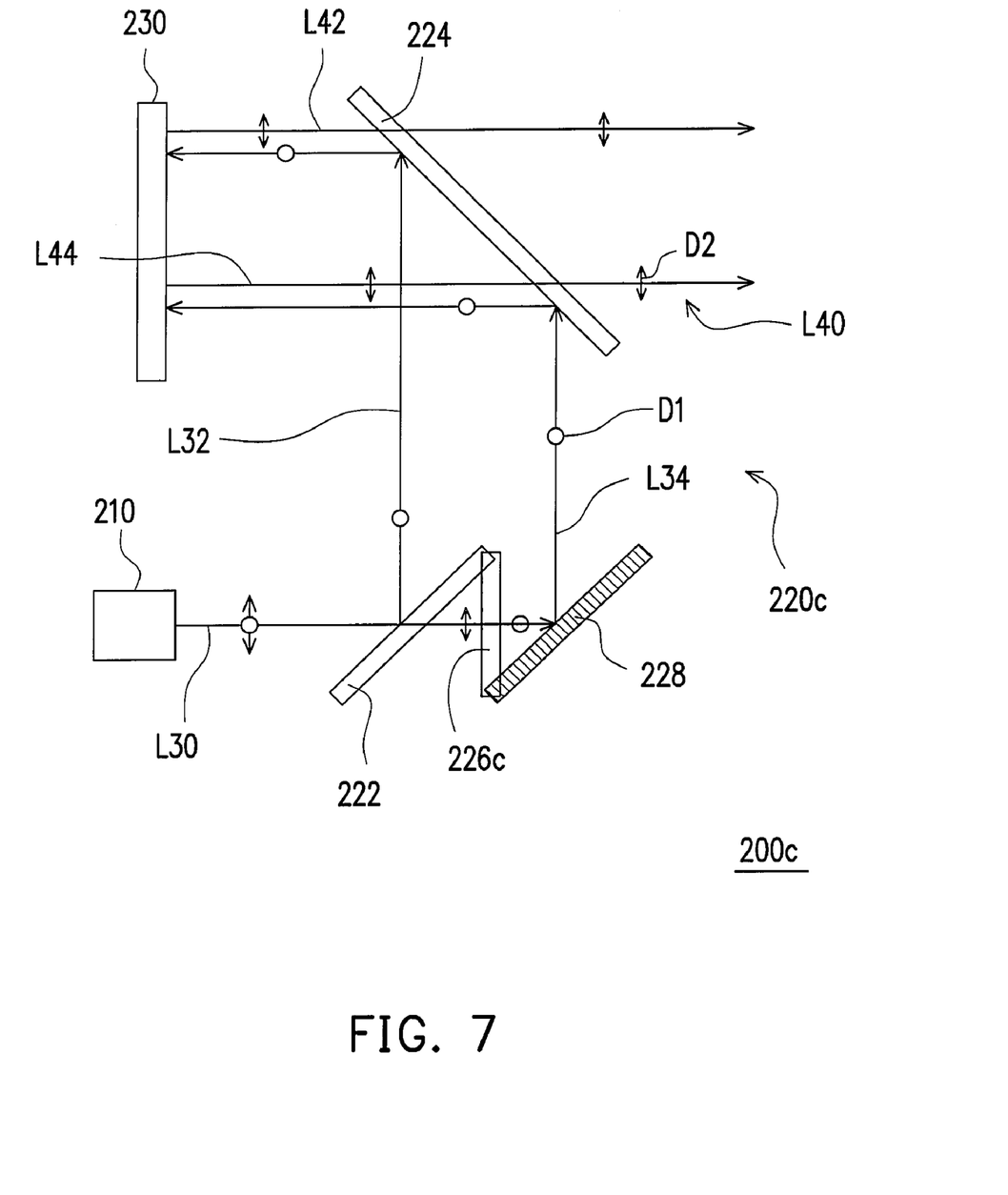

Referring to FIG. 7, the beam splitting/combining device 220c in the optical system 200c includes a first PBS 222, a second PBS 224, a HWP 226c, and a reflector 228. The first PBS 222 reflects the first illumination beam L32 with the first polarization D1 coming from the light source 210 to the light valve 230 while transmits the second illumination beam L34 with the second polarization D2 coming from the light source 210. The first illumination beam L32 coming from the first PBS is then reflected by the second PBS 224 to the light valve 230. The second illumination beam L34 coming from the first PBS 222 passes through the HWP 226c, being converted into the second illumination beam L34 with the first polarization D1. The second illumination beam L34 is then reflected by the reflector 228, and reflected by the second PBS 224 to the light valve 230. The light valve 230 converts the first illumination beam L32 and the second illumination beam L34 coming from the second PBS 224 into the first image beam L42 and the second image L44 respectively. The first image beam L42 and the second image beam L44 having the second polarization D2, pass through the second PBS 224 and combine to form the image beam L40.

It should be noted that the optical systems disclosed above may be applied to the projector in the same manner as shown in FIG. 2.

In summary, in the embodiments disclosed above, illumination beams with both polarization are converted into image beams, that is to say, the optical systems in the aforementioned embodiments can utilize more illumination beam than conventional optical system. Thus, the optical systems in the above-stated embodiments have higher efficiency and better performance, and may raise the image quality of the projector utilizing the optical systems.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical system, adapted for providing an image beam, comprising:
    a light source, adapted for providing an illumination beam including a first illumination beam with
    a first polarization, and a second illumination beam with a second polarization;
    a beam splitting/combining device, comprising:
    a first PBS, reflecting the first illumination beam from the light source, and the second illumination beam from the light source passes through the first PBS;
    a second PBS, reflecting the second illumination beam from the first PBS;
    a QWP, wherein of the first illumination beam reflected by the first PBS passes through the QWP;
    a first reflector, reflecting the first illumination beam from the QWP, wherein the first illumination beam from the first reflector passes through the QWP, and then passes through the first PBS;
    a second reflector, reflecting the first illumination beam passing through first PBS, wherein the first illumination beam reflected by the second reflector is reflected by the second reflector; and
    a light valve, adapted for converting the first illumination beam from the second PBS into a first image beam passing through the second PBS, and converting the second illumination beam from the second PBS into a second image beam passing through the second PBS, wherein the first image beam combines with the second image beam to form the image beam.

2. The optical system according to claim 1, further comprising a analyzer, disposed on the optical path of the image beam.

3. The optical system according to claim 1, wherein the reflector is a reflective film coated on the QWP.

4. The optical system according to claim 1, wherein a normal vector of the second PBS crosses a plane formed by normal vectors of the first PBS, the first reflector, the second reflector, and the QWP.

5. The optical system according to claim 1, wherein the first polarization is S polarization and the second polarization is P polarization.

6. The optical system according to claim 1, wherein the first polarization is P polarization and the second polarization is S polarization.

7. An optical system, adapted for providing an image beam, comprising:
- a light source, adapted for providing an illumination beam including a first illumination beam with a first polarization, and a second illumination beam with a second polarization;
- a beam splitting/combining device, comprising:
- a first PBS, reflecting the first illumination beam from the light source, and the second illumination beam from the light source passes through the first PBS;
- a second PBS, reflecting the first illumination beam from the first PBS;
- a HWP, wherein the second illumination beam from the first PBS passes through the HWP;
- a reflector, reflecting the second illumination beam from the HWP, wherein the second illumination beam reflected by the reflector is reflected by the second PBS; and
- a light valve, adapted for converting the first illumination beam from the second PBS into a first image beam passing through the second PBS, and converting the second illumination beam from the second PBS into a second image beam passing through the second PBS, wherein the first image beam combines with the second image beam to form the image beam.

8. The optical system according to claim 7, further comprising an analyzer, disposed on the optical path of the image beam.

9. The optical system according to claim 7, wherein the first polarization is S polarization and the second polarization is P polarization.

10. The optical system according to claim 7, wherein the first polarization is P polarization and the second polarization is S polarization.

* * * * *